Sept. 21, 1965    C. Z. MONROE ETAL    3,207,049
MACHINE FOR FORMING PLASTIC COATED PAPERBOARD CONTAINERS
AND ERECTING AND DELIVERING MEANS THEREFOR
Original Filed Nov. 7, 1960    10 Sheets-Sheet 1

INVENTORS
Charles Z. Monroe
Harry B. Egleston
Wolfe, Hubbard, Voit & Osann
ATTORNEYS

INVENTORS
Charles Z. Monroe
Harry B. Egleston
Wolfe, Hubbard, Voit & Osann
ATTORNEYS

FIG. 11
FIG. 12

Sept. 21, 1965   C. Z. MONROE ETAL   3,207,049
MACHINE FOR FORMING PLASTIC COATED PAPERBOARD CONTAINERS
AND ERECTING AND DELIVERING MEANS THEREFOR
Original Filed Nov. 7, 1960   10 Sheets-Sheet 9 though brief references to certain of such prior patents and applications may be necessary or desirable from time to time in the description which follows.

United States Patent Office 3,207,049
Patented Sept. 21, 1965

3,207,049
MACHINE FOR FORMING PLASTIC COATED PAPERBOARD CONTAINERS AND ERECTING AND DELIVERING MEANS THEREFOR
Charles Z. Monroe, Detroit, and Harry B. Egleston, Livonia, Mich., assignors to Ex-Cell-O Corporation, Detroit, Mich., a corporation of Michigan
Original application Nov. 7, 1960, Ser. No. 67,842, now Patent No. 3,120,089, dated Feb. 4, 1964. Divided and this application July 3, 1963, Ser. No. 303,699
17 Claims. (Cl. 93—44.1)

This application is a division of our copending application Serial No. 67,842, filed November 7, 1960, now Patent No. 3,120,089, issued February 4, 1964, and the invention herein relates to carton forming machinery and, more specifically, to a novel machine for forming, erecting and delivering plastic coated gable top containers of paperboard or the like. The machine finds particular, but not exclusive, utility in producing filled and sealed cartons from flat collapsed blanks of paperboard or the like having a thermoplastic moistureproof coating on their inner and outer surfaces.

One illustrative form of carton adapted to be processed by the machine disclosed and claimed herein is shown in Egleston et al. copending application Serial No. 136,505, filed in the United States Patent Office on September 7, 1961, now Patent No. 3,120,335, issued February 4, 1964. More detailed information on such carton may, of course, be had upon direct reference to such application. For present purposes, however, it will suffice to note that the container or carton disclosed therein is made of high grade paperboard stock coated on both sides with a thermoplastic material such as polyethylene. The polyethylene coating on the paperboard is utilized not only as a moistureproofing material but also serves as a heat and pressure sensitive adhesive which cooperates in sealing the closure elements of the container so as to make a fluidtight package. Because sealing involves the application of considerable heat and pressure, suitable precautions must be taken to avoid damaging the polyethylene coating as the cartons are erected and sealed. Major reasons for this are the relatively low melting point of polyethylene and its tendency to stick to heated surfaces.

One object of the present invention is to provide a high speed, automatic, precision machine for receiving stacked carton blanks of paperboard or the like each having a thermoplastic coating such as polyethylene on both sides and for forming such blanks successively into erected and filled cartons having tightly sealed top and bottom closures by utilizing the thermoplastic coating as an adhesive.

Another object of the invention is to provide a machine of the character set forth and which will be adapted to fuse and seal the coated closure elements of the carton without damaging the moistureproof integrity of the thermoplastic coating thereon.

Still another object of the invention is to provide a machine of the foregoing type and which will effectively maintain the sanitary integrity of the carton from its initial stage as a flat collapsed blank until it emerges from the machine as a filled and sealed carton.

Other objects and advantages will become apparent in the light of the following detailed description, taken together with the accompanying drawings, wherein.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Figures 1, 1A:
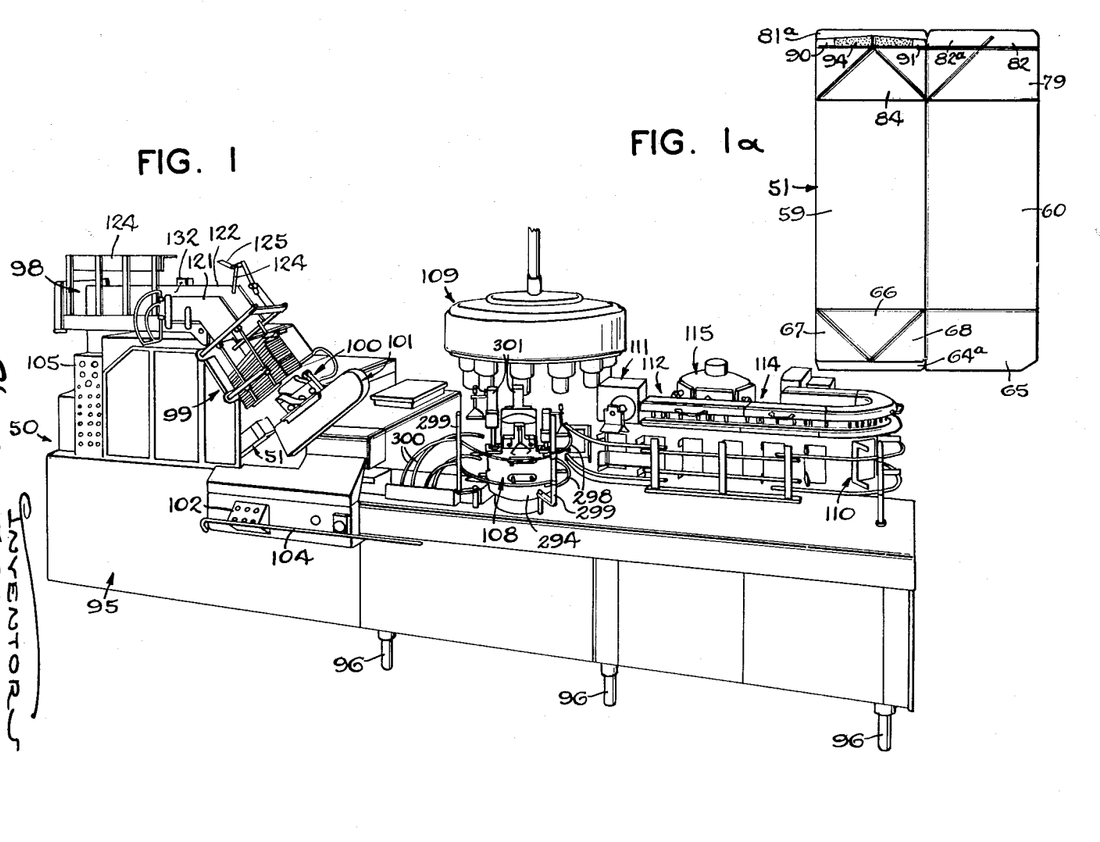
FIGURE 1 is a perspective view of an illustrative carton forming machine embodying the present invention.
FIG. 1a is a plan view of a flat collapsed carton blank in the form in which it is presented to the machine of FIG. 1 for processing.
Figure 2:
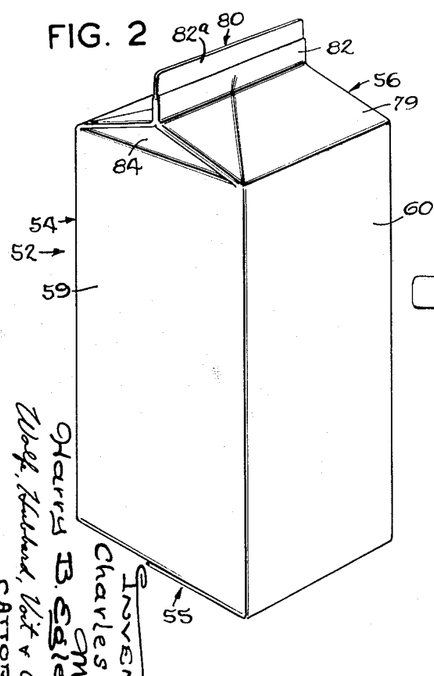
FIG. 2 is a perspective view of an erected, filled and sealed carton in the condition in which it is discharged from the machine of FIG. 1 upon completion of its processing.

Referring more specifically to FIG. 1, the invention is there exemplified in an illustrative machine 50 adapted to receive a supply of flat collapsed blanks 51 such as shown in FIG. 1a, process them automatically at high speed, and to discharge them in the form of filled and sealed cartons 52 such as the one illustrated in FIG. 2. Before presenting a detailed description of the machine 50, however, it would be desirable to outline briefly the salient features of the carton blank 51 and the carton 52 processed by the machine 50.

As shown more particularly in FIGS. 1a, 2, 3, 6 and 7, it will be noted that the carton 52 comprises a tubular body 54 of generally rectangular cross section having a bottom closure 55 and a top closure 56. Both the top and bottom closures are formed from integral extensions of the carton body and are held and sealed together in a manner which takes full advantage of the properties of the thermoplastic coating on the carton material.

The carton 52 is fashioned from a flat blank of paperboard or the like coated on both sides with thermoplastic material such as polyethylene, as pointed out earlier herein. The blank is divided by means of an appropriate pattern of score lines into a plurality of panels and areas which are utilized for the walls and the closure parts of the carton. Upon reference to FIG. 6, which illustrates the inner face of the blank, it will be noted that the body portion of the carton is defined by four side panels 58, 59, 60, 61 and a side seam flap 62 which is adhesively secured to the inner face of the side panel 58.

Figure 3:
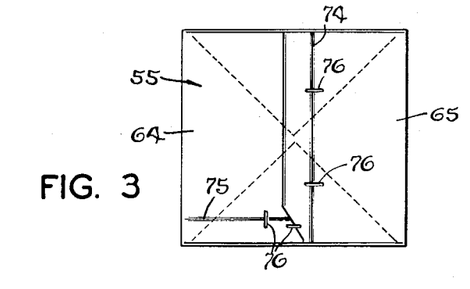
FIG. 3 is a bottom view of the carton of FIG. 2.

The bottom closure 55 is defined in part by a pair of major bottom panels 64, 65 which are integral extensions of alternate side panels 58, 60, and in part by a plurality of minor triangular panels 66, 67, 68 and 69, 70, 71 which are integral extensions of alternate side panels 59, 61. All of the bottom closure panels are integral parts of the blank and adjacent ones are separated from each other only by score lines which ultimately define the various folds or creases required to complete formation of the bottom closure. When the bottom closure is formed, the triangular panels 66, 69 fold inwardly toward one another and the respective pairs of smaller triangular panels associated with them fold back against the inner faces of the major bottom panels 64, 65. The projecting lateral edges 72 of the panel 64 are chamfered slightly, defining in the projecting portion of the panel 64 a tuck-in flap 64a which is inserted between the inner face of the major bottom panel 65 and the triangular foldback panels 68, 70 which tend to fold back toward the inner face of the panel 65. The bottom closure parts, when fully infolded, are pressed flat and heat sealed in this position, as illustrated in FIG. 3. Any potential leakage channels between folds, or exposed raw edges of the blank, are sealed as by means of linear shaped embossments 74, 75, and by transversely disposed embossments 76 in the shape of relatively short rectangular notches (FIG. 3).

The top closure 56 (FIG. 2) has substantially a gable top configuration comprising a pair of inclined roof panels 78, 79 surmounted by an upstanding top rib 80, defined in part by rib panels 81, 82. Interposed between the roof panels are triangular end panels 84, 85 each connected respectively to a pair of triangular foldback panels 86, 87 and 88, 89. Each pair of foldback panels is also connected to a corresponding pair of inner rib panels 90, 91 and 92, 93.

The top closure of the carton 52 also includes an extensible pouring spout which, in this instance, happens to be defined by triangular end panel 84, foldback panels 86, 87 and inner rib panels 90, 91. Initially, the spout is disposed in collapsed condition within the top closure and protectively sealed by means of sealing panels 81a, 82a which are abuttingly secured together along the entire length of the top rib. To facilitate easy opening of the carton 52 and accessibility of the pouring spout, the pouring edges of the latter, together with the major areas of the inner rib panels 90, 91, may be covered with a patch or lip 94 of adhesive material. By this is meant material which will not bond to itself or to the thermoplastic coating on the surfaces of the blank during heat sealing of the top closure. Consequently, upon application of upward and outward thumb pressure to the infolded triangular panels 86, 87 under the inclined roof panels 78, 79, the bond between sealing panels 81a, 82a and the outer ends of the inner rib panels 90, 91 becomes torn or fractured, rendering the spout accessible and permitting the same to be sprung into its outwardly extended position ready for pouring.

*General machine organization*

Figure 5:
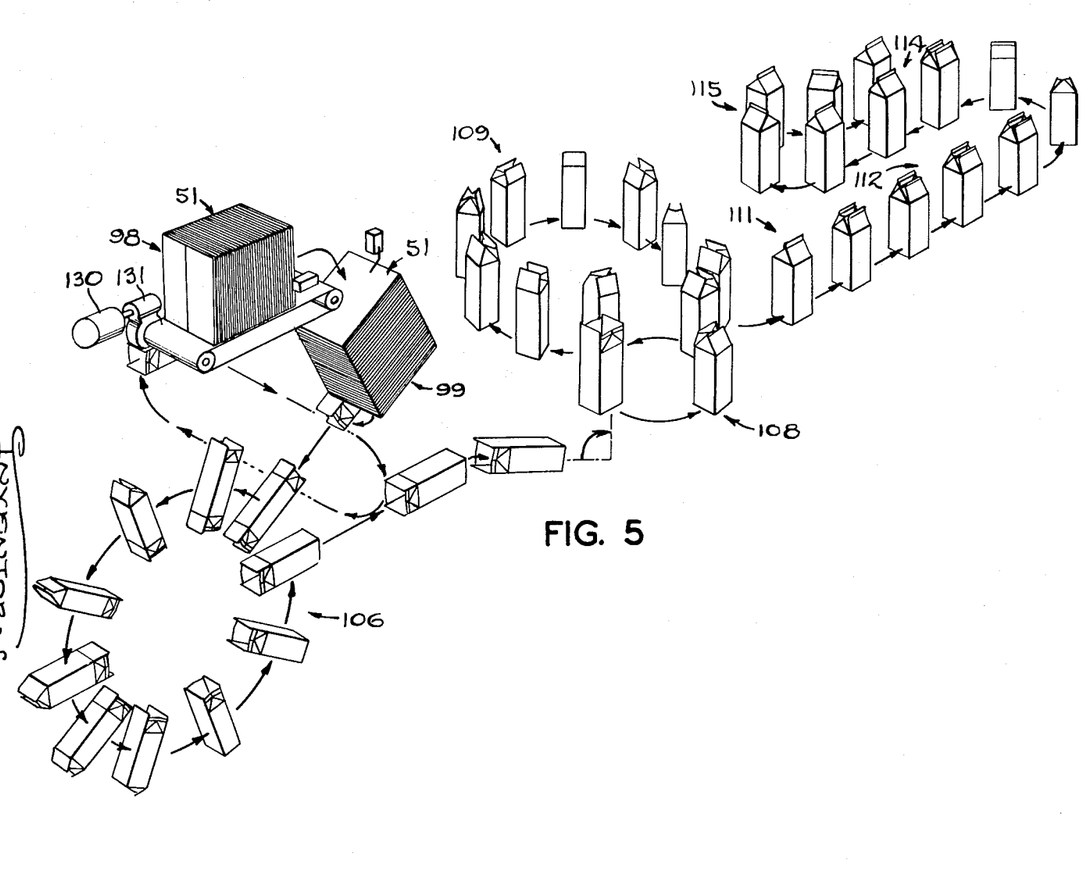
FIG. 5 is a diagrammatic perspective view illustrating the carton path and sequential positions of the carton as it passes through the machine incident to being processed therein.
Figures 6, 7:
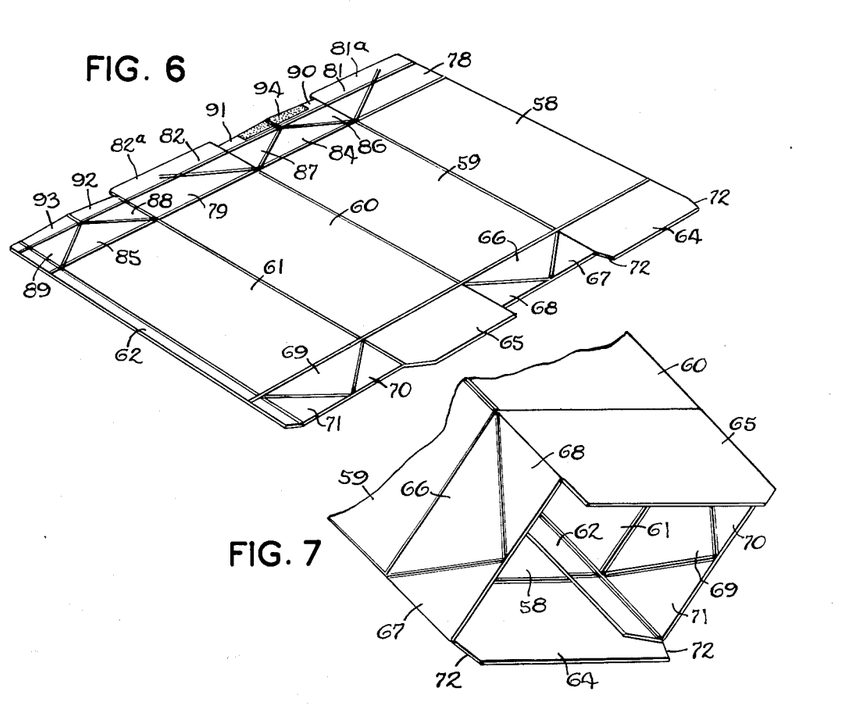
FIG. 6 is an enlarged perspective view showing the inside face of the blank of FIG. 1a, the blank being opened out flat for purposes of better illustration.
FIG. 7 is an enlarged fragmentary perspective view showing the bottom closure elements of the blank and carton of FIGS. 1a, 2, 3 and 6.

Referring more particularly to FIGS. 1 and 5, the illustrative machine 50 is adapted to receive a supply of flat folded tubular blanks 51 such as the one illustrated in FIG. 1a and described earlier herein. The blanks are stacked, top down, in a magazine from which they are successively withdrawn by means of a feeder, erected into open-ended tubular form and loaded onto a multi-station bottom forming mechanism which forms and heat seals the bottom closure. Following the formation of the bottom closure, the blanks are successively transferred to a rotary top breaker mechanism and thence to a rotary filler mechanism. After filling, the blanks, which are partially completed cartons open at the top, are presented to a rotary steepler mechanism, resulting in further breaking or flexing of the top closure elements about their score lines. The filled, open cartons are then conveyed beneath stationary top heater and closer units which activate the thermoplastic on the top closure elements and bring them together without applying any substantial pressure. The closed cartons are then presented to a rotary sealer unit which applies sealing pressure to the top closure elements. Following this, the filled and sealed cartons pass through a pair of dater rolls and are discharged in a continuous procession from the machine. For convenience, the partially completed cartons will be designated by the reference numeral 51 at their various stages of completion in the machine, and by the numeral 52 upon emergence from the machine as a finished product.

The machine 50 comprises a console 95 supported on legs 96 and supplied with utilities such as electric power, compressed air, and cooling water from appropriate external sources. A magazine loader 98 and magazine 99 are mounted on top of the console at one end of the machine. Operatively associated with the magazine and adjacent to it are a feeder mechanism 100 and a loader mechanism 101. On the side of the console below these mechanisms is the operator's control panel 102 for the machine and an emergency stop bar 104. To the left of the control panel 102 (as viewed in FIG. 1) and beneath the magazine loader 98, is the operator's indicator panel 105. The latter reflects satisfactory or unsatisfactory performances of the various units throughout the machine so that trouble spots can be quickly pinpointed and corrected.

Bottom forming mechanism 106 is situated roughly between the indicator panel 105 and the loader 101, being housed within an appropriate protective enclosure. The mechanism 106 is adapted to receive blanks successively from the loader 101, top down, and to move them from station to station in an orbital path to form their bottom closure. The blanks are then ejected and presented to a transfer receptacle which shifts them from a horizontal to a vertical position and presents them to a rotary top breaker unit 108 on top of the console. From this point on, the cartons remain above the top of the console.

The rotary top breaker unit 108, which happens to rotate counterclockwise when viewed from the top, presents the open top carton to rotary filler unit 109. The latter, which rotates clockwise when viewed from the top, fills the cartons successively and presents them to a main conveyor 110. The main conveyor thereupon moves the filled cartons, still open at the top, under a rotary steepler mechanism 111, and thence under stationary top heater and closer units 112, 114. From here, the filled and closed cartons are transferred to a rotary top sealer unit 115. After final sealing on the latter, the filled and completed cartons are passed through dater rolls and discharged from the machine.

The magazine and magazine loader 99 and 98, respectively, comprise the subject matter of our copending divisional application, Serial No. 297,482, filed concurrently herewith. It will suffice for the present purposes, therefore, to note that a magazine and magazine loader are provided for assuring the presence of a supply of collapsed blanks at all times during the operation of the machine. The feeder and loader mechanisms 100, 101 are adapted to withdraw blanks successively from the magazine, erect them into open-ended tubular form, and then load them into the bottom closing mechanism 106. For such purpose, these mechanisms are driven in synchronism with each other from the main drive of the machine.

Bottom forming mechanism

The bottom forming mechanism 106 (FIGS. 4a and 8) comprises an intermittently driven mandrel assembly 142 carrying a plurality of radially disposed mandrels 141, in this instance ten in number, and a plurality of cooperating station units with which the mandrels are adapted to register sequentially during the course of their intermittent or indexing movement. These station units are a bottom breaker unit 144, a plurality of heater units 145, 146, 147, a bottom closing unit 148, and two bottom sealing units 149, 150. Both the mandrel assembly and the station units are supported on a relatively heavy upright frame panel 151 within the machine console.

The mandrel assembly 142 comprises a relatively large diameter hollow shaft 152 journaled in an appropriate bearing 154 carried by the frame panel 151 and projecting substantially beyond both faces of the latter. The end of the shaft 152 extending toward the control panel side of the machine has fixed thereto a large polygonal hub 155. In the present instance, the hub 155 has ten equally spaced annular seats on its outer surface and which receive the inner end portions of the mandrels and their mounting flanges 156. Each mandrel is constructed with a cooling chamber 158 (FIG. 8) adjacent its outer end to preclude adhesion between the end face of the mandrel and the bottom closure parts of the carton 51 being formed thereon. Water or other suitable fluid coolant is circulated through the chambers 158 via supply and exhaust conduits 159, 160 in each mandrel which may be connected in any suitable manner with coolant supply and exhaust lines 161, 162 (FIG. 4a) through the hollow shaft 152.

Power for driving the mandrel assembly 142 with a step-by-step indexing motion is furnished by main drive motor 164 of the machine via chain and sprocket drive 165 and main drive shaft 166. The latter has fixed thereon a barrel cam 168 which drives a spider wheel 169 keyed or otherwise secured to the mandrel assembly shaft 152. The track of cam 168 includes sufficient dwell so that the spider 169, through its follower rollers 170, is given an intermittent angular motion which is, of course, imparted to the mandrel assembly.

Figure 8:
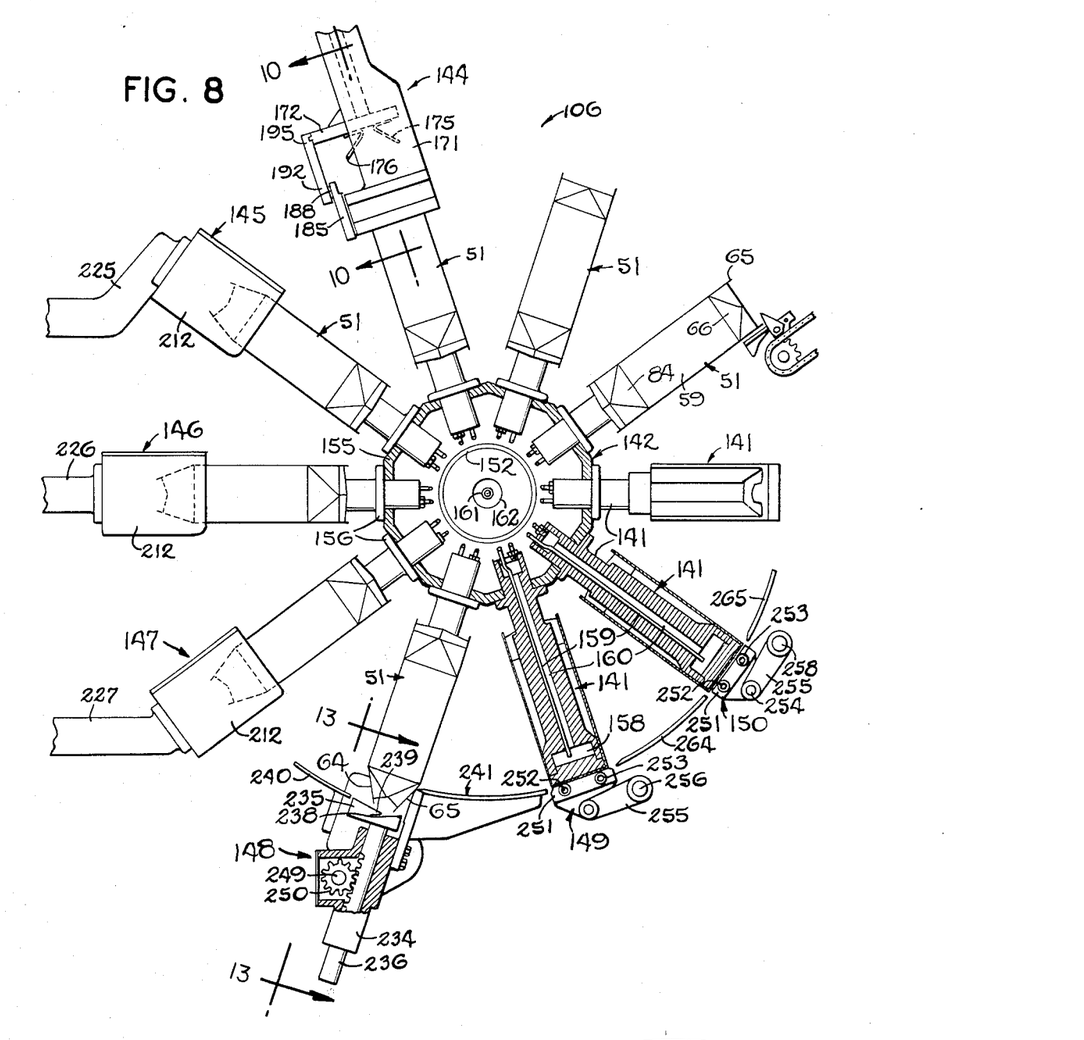
FIG. 8 is an end elevational view of the mandrel wheel assembly of the machine including various associated units for operating on the carton at different stations along its path of movement.
Figures 9, 10:
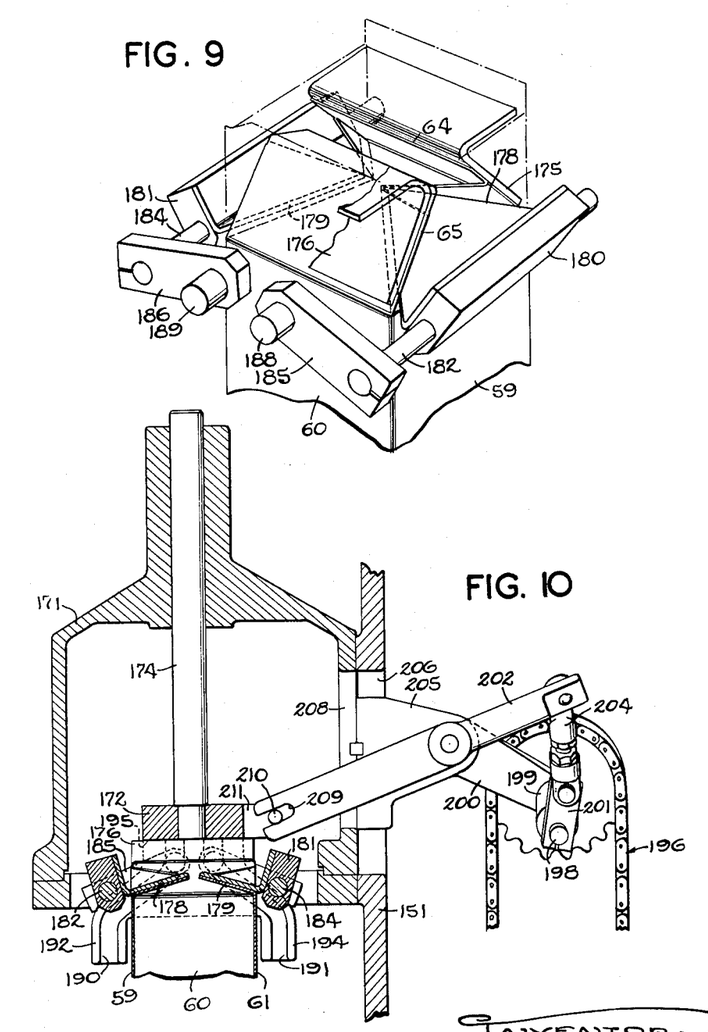
FIGS. 9 and 10, respectively, are enlarged fragmentary views, in perspective and end elevation, respectively, detailing the bottom breaker mechanism.

Following the loading of an open-ended carton blank 51 on the mandrel by the loader mechanism 101, top down, the mandrel assembly moves the blank through two indexing steps, the second step bringing the blank into register with the bottom breaker unit 144 (FIGS. 8, 9 and 10). In this position, all the bottom closure panels overhang the end of the mandrel and the common score line connecting them to the carton side panels is approximately even with the end face of the mandrel. The major bottom panel 65 is in leading position and the other major bottom panel 64 is in trailing position with respect to the direction of mandrel movement. Minor triangular panels 66, 67 and 68 face the operator's side of the machine, while minor triangular panels 69, 70, 71 face the main frame panel 151.

The bottom breaker unit 144 is adapted to effect substantial prebending of the bottom closure parts on their respective score lines and toward their closed position. The prebending action is carried to a sufficient extent to create along each score line, in so far as possible, a permanent set in the paperboard and its thermoplastic coating. This greatly facilitates the subsequent closing and sealing of the bottom closure elements of the blank.

Figures 11, 12:
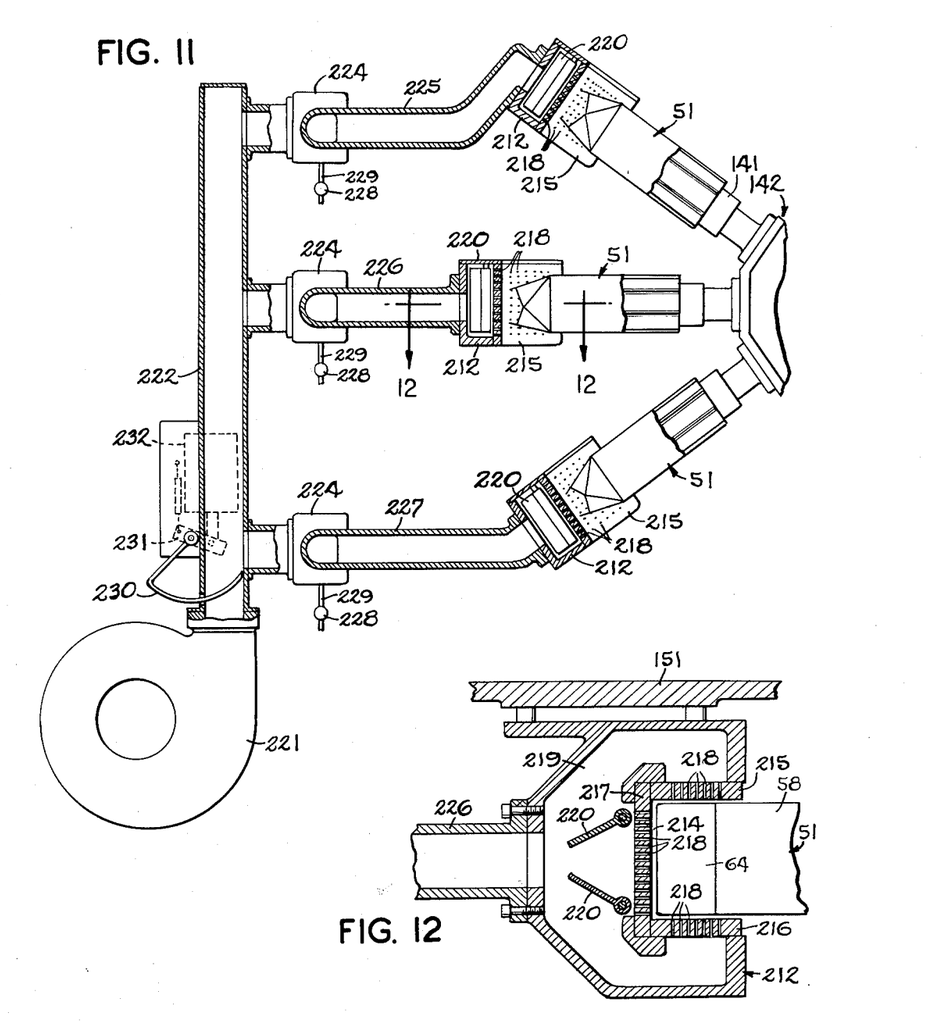
FIG. 11 is a fragmentary elevational view showing a portion of the mandrel wheel assembly and the cooperating heater arrangement for preparing the bottom closure flaps for sealing.
FIG. 12 is an enlarged fragmentary sectional view through one of the mandrels and heating elements taken in the plane of the line 12—12 in FIG. 11.

As illustrated in FIGS. 10 and 12, the bottom breaker unit 144 comprises a relative heavy bridge or frame member 171 fixed to the main frame panel 151 in generally overlying relation with the mandrel assembly 142. The bridge member 171 carries a crosshead 172 fixed to a guide plunger 174 and both mounted for reciprocation along a projection of the radial axis of the underlying registered mandrel. Depending from the underside of the crosshead 172, and adapted to cam the major bottom panels 64, 65 inwardly as the crosshead approaches the end face of the mandrel, are a pair of folder wings 175, 176 (FIGS. 8 and 9). In the present instance, the folder wings 175, 176 are fashioned as stamped plates of relatively heavy guage sheet metal fixed to the underside of the crosshead 172 in any suitable manner.

Pivotally mounted on the bridge 171, and adapted to exert inward folding pressure on the minor triangular panels 65 and 66 as the crosshead descends with the folder wings 175, 176, are a pair of triangular folding fingers 178, 179. The latter may also be fashioned as stampings of relatively heavy gauge sheet metal. The fingers 178, 179 are fixed as by means of mounting blocks 180, 181 to respective ones of a pair of rock shafts 182, 184 journaled on the bridge 171 in straddling relation with the other end of the mandrel. Each of the rock shafts 182, 184 has an end portion extending beyond the bridge 171 and carrying a corresponding one of a pair of rocker arms 185, 186. The latter have adjacent their projecting ends follower bosses or rollers 188, 189 which engage corresponding ones of cam tracks 190, 191 in depending cam arms 192, 194 fixed to the crosshead. In the present instance, the arms happen to be integral parts of a bifurcated plate member 195 rigidly fixed to the left-hand end of the crosshead (as viewed in FIG. 8). By reason of this connection, it will be appreciated that the fingers 178, 179 are rocked inwardly as the crosshead approaches the mandrel face with the wings 175, 176, and outwardly as the crosshead and wings retreat from the mandrel face.

Figure 4:
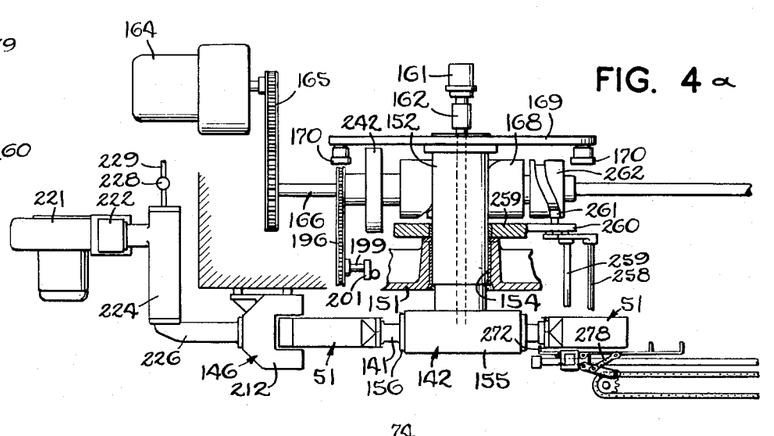
FIGS. 4a and 4b are companion diagrammatic views which together present a plan view of the main drive system of the machine.

For the purpose of driving the crosshead, folder wings and folder fingers in timed relation with the mandrel assembly so that the folding of the bottom closure panels will occur while the mandrel dwells in registered position with the bottom breaker unit, the latter is connected to the main drive shaft 166. The drive comprises a chain and sprocket take-off 196 from the main drive shaft 166 and which rotates a small crank shaft 198 journaled in a boss 199 fixed on the rear side of the main frame panel 151 (FIGS. 4a and 10). The boss 199 is mounted on an outwardly extended arm 200 fixed in any suitable manner to the frame panel 151. The crankshaft 198 has fixed thereon a crank arm 201 which in this instance is drivingly connected to a rocker arm 202 by means of an angularly disposed, adjustable swivel link 204. The rocker arm 202 is pivotally mounted on brackets 205 fixed to the frame panel 151 and extends through aligned slots 206, 208 in the panel 151 and rear wall of bridge 171. The forwardly extending end of rocker arm 202 is formed with a slot 209 which engages a pin 210 fixed between a pair of lugs 211 on the crosshead 172. By reason of this arrangement, rotation of the crankshaft 201 will effect oscillation of the rocker arm 202 and this, in turn, will effect reciprocation of the crosshead 172 and the parts associated therewith. Even though there is a small amount of angularity between the plane of rotation of the crank 201 and the plane of oscillation of the rocker arm 202, the swivel link 204 provides adequate accommodation.

Following the bottom breaking operation, the mandrel assembly indexes the carton 51 around to the heater stations 145, 146 and 147. In order to avoid overheating of the bottom with possible damage to the paperboard or the thermoplastic coating, and yet drive sufficient heat into the bottom closure panels to achieve effective sealing, resort is had to a series of heating stations, in this instance, three in number (FIGS. 4a, 8, 11 and 12). These stations are substantially identical and are adapted to apply warm air to both sides of the bottom closure panels so as to raise their temperature sufficiently to activate the adhesive action of the thermoplastic coating on the carton blank. Where polyethylene is used as such coating, the temperature of the blank must be increased to approximately 350 to 500 degrees Fahrenheit.

As shown more particularly in FIGS. 11 and 12, each heater station comprises a hollow boxlike heater head 212 fixed to the main frame panel and adapted to nestingly straddle the radially projecting bottom closure panels of the carton 51 as it is held in position by an underlying registered mandrel. For this purpose, the head 212 includes a tunnel 214 which receives the bottom closure panels and which is defined by a plurality of perforated walls 215, 216 and 217. Each of the latter has a series of relatively small diameter nozzle passages 218 arranged in spaced relation over its face area and adapted to apply warm air to the adjacent bottom closure panels of the blank. Air is supplied to the passages 218 from a plenum chamber 219 within the head. The relative amount of air discharged from the passages 218 of any of the walls 215, 216, 217 may be suitably regulated as by means of baffles 220 in the chamber 219.

Air is supplied to the heater heads 212 from a blower 221 mounted near the lower left corner of the frame panel 151 as viewed in FIGS. 4a and 11. The blower 221 discharges into a vertical manifold 222 which connects at vertically spaced points with three separate combustion chambers 224. The latter are connected to respective ones of the heads 212 via individual supply ducts 225, 226 and 227 (FIG. 11) which communicate respectively with the plenum chamber of each head.

Each combustion chamber 224 includes an appropriate gas burner and igniter (not shown). Each burner is supplied with an appropriate mixture of air and gas from an external supply via a control valve 228 and branch line 229. Combustion is, of course, carefully controlled so as to be as complete as possible. With an excess of air (as far as the burner is concerned) supplied to the burner, the combustion products mix with the excess air in the combustion chamber, resulting in the discharge of a blast of heated air at each heater head 212 having, in the present instance, a temperature of about 800 degrees Fahrenheit. By the time the blank 51 is ready to leave the last heater station 147, its bottom closure panels have been heated to a temperature of 350 to 500 degrees Fahrenheit and are ready for closing and sealing.

Figure 13:
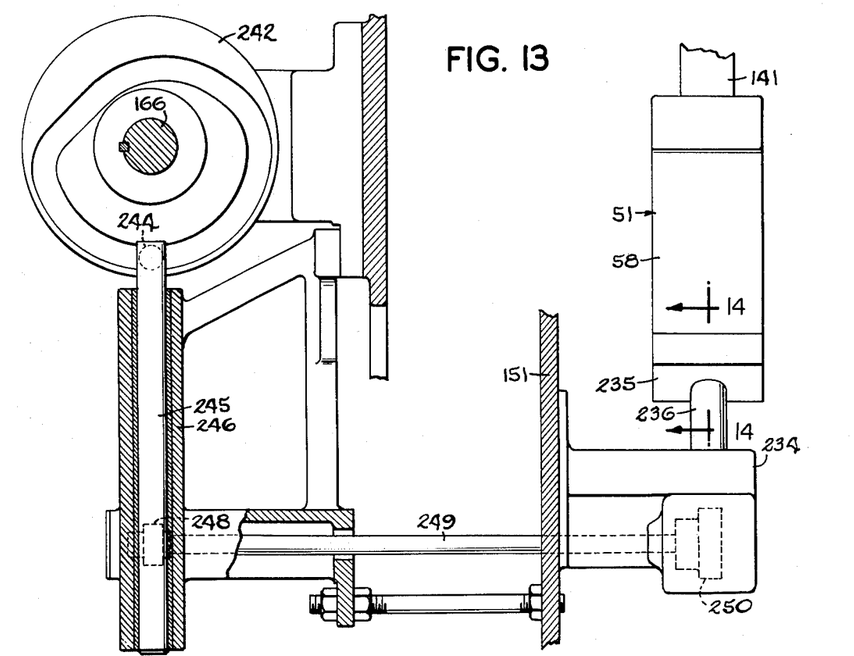
FIG. 13 is an enlarged fragmentary transverse sectional view taken in the plane of the line 13—13 in FIG. 8 and showing a portion of the bottom closing mechanism and its associated drive.

Provision is made for automatically reducing the temperature and amount of warm air discharged from the heater heads 212 to prevent thermal damage to the carton blanks thereunder in event of a temporary stoppage of the machine due, for example, to a jam at some transfer point. This is accomplished in part by curtailing the amount of air supplied by the blower 221 and in part by curtailing the amount of gas supplied to the burners of the combustion chamber. Referring further to FIG. 13, it will be noted that in the present instance a shut-down baffle 230 is interposed in the manifold 222 between the blower 221 and the first outlet opening. The baffle 230 is fixed to a rocker arm 231 spring-biased to hold the baffle in a normally open position. The rocker arm 231 is also connected to an actuator 232, which may be a solenoid or an air cylinder, related to the main drive control in such a manner that it shifts the rocker arm and baffle to a shut-down position upon stoppage of the machine. By the same token, the air-gas control valves 228 are similarly related to the main drive control so as to shift to a shut-down position concurrently with, or slightly before, the baffle 230.

The shut-down position of both the baffle 230 and valves 228 in this case is such as to drastically curtail the flow of the air-gas mixture, and the secondary air, respectively. The baffle 230 and valves 228 shift to open position, restoring the flow of air and gas, as an incident to restarting of the machine. In some instances, however, it may be preferable for these members to stop the flow of air and gas altogether during stoppage of the machine. In that event, the burners are ignited as an incident to restarting of the machine.

After the heating operation, the mandrel assembly indexes and carries the blank 51 from the last heater unit 147 to the bottom closing unit or station 148 (FIG. 8). At this point, the bottom closure panels have been heated to a temperature sufficient to activate the adhesive action of their thermoplastic coating. In such condition, the particular coating used on the blank 51 will adhere to itself and to hot surfaces but not to cold surfaces of other material.

Figure 14:
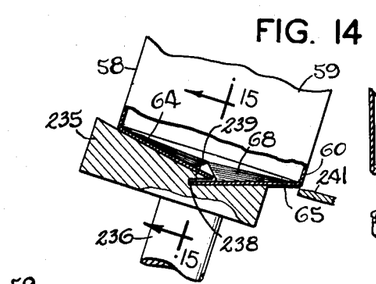
FIG. 14 is an enlarged fragmentary vertical sectional view taken in the plane of the line 14—14 in FIG. 13 and detailing the manner in which the bottom closing unit tucks and closes the bottom flaps of the carton.
Figure 15:
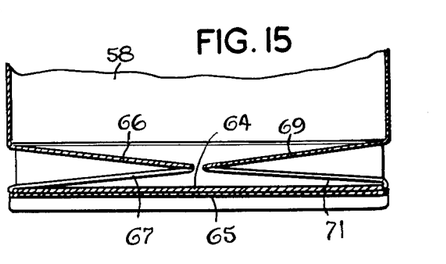
FIG. 15 is an enlarged fragmentary vertical sectional view through the carton bottom taken in the plane of the line 15—15 in FIG. 14.

The bottom closing unit 148 (FIGS. 8, 13 and 14) comprises a support block 234 fixed to the lower portion of the frame panel 151. The support block carries a closer shoe 235 and its guide plunger 236, both mounted for reciprocation approximately along a projection of the radius of the registered mandrel. The upper face of the closer shoe 235 is concave in a direction transverse to the plane of rotation of the mandrel assembly, such shape being defined by two angular surfaces. One such surface is undercut with respect to the other, defining a transverse slot 238 and a wedge-shaped tuck-in blade 239 in the central portion of the shoe (FIGS. 8 and 14). Upon elevation of the shoe 235 toward the mandrel (FIGS. 13, 14), the slot 238 is adapted to engage the projecting end of the major bottom panel 65. At the same time, the blade 239 is adapted to engage the major bottom panel 64 and to tuck it into the space between the inner face of the panel 65 and the adjacent triangular fold-back panels 68, 70 (FIGS. 14, 15). The shoe 235 dwells in elevated position for a sufficient interval to permit withdrawal of the blade 239 from the closed, tucked-in bottom as an incident to the next step of indexing movement of the mandrel assembly.

For the purpose of assuring proper orientation of the bottom closure panels on entering and leaving the closing station 148, the later is equipped with fixed arcuate guides 240, 241. The guide 240 is disposed to prevent jamming or tearing of the free lower end of the bottom panel 64 against the edge of the shoe 235 when the same is in lowered position. The guide 241, on the other hand, is arranged to hold the closed bottom in that condition as the mandrel assembly moves it from the raised shoe 235 to the sealing station 149.

Provision is made for driving the closer shoe 235 to reciprocate in properly timed relation to the mandrel assembly. For this purpose, the main drive shaft 166 has fixed thereon a face plate cam 242 (FIGS. 4a and 13). The latter drives, through follower roller 244, a reciprocating plunger 245 slidably mounted in a fixed sleeve 246 to the rear of the main frame panel 151. The plunger 245 has rack teeth which mesh with pinion 248 fixed to cross shaft 249. The latter extends into the support block 234 and has another pinion 250 fixed thereon. The pinion 250, in turn, drivingly meshes with rack teeth on the guide plunger 236 of closer shoe 235 (FIGS. 8 and 13).

Figure 16:
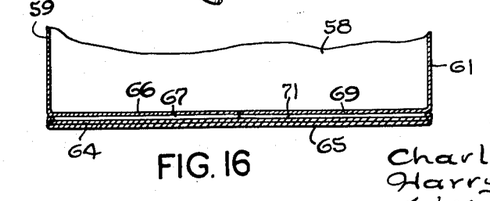
FIG. 16 is a view corresponding to FIG. 15 but with the carton bottom elements in completely closed and sealed condition.

From the bottom closing unit 148, the blank 51 next passes to the bottom sealing units 149, 150. The latter are substantially identical and, in this instance, two such units are used in order to subject the bottom closure to pressure for the necessary total interval of sealing time. As illustrated in FIG. 8, each sealing unit comprises a pressure pad 251 having fluid coolant circulating therethrough via inlet and outlet passages 252 and 253. Each pressure pad is pivotally connected as by pin 254 to a rocker arm 265 which is adapted to move it through a relatively short displacement between a pressure applying position where it squeezes the bottom closure panels against the end face of the mandrel, causing them to assume the condition of FIG. 16, and an inactive position spaced farther away from the end face of the mandrel. The pivotal mounting tends to give each pressure pad a limited amount of float, permitting it to accommodate readily to the bottom closure elements of the blank 51 as it presses them against the end face of the mandrel.

The rocker arms 255 are driven by respective ones of rock shafts 256 and 258 which extend through the main frame panel 151 (FIGS. 4a and 8). The inner ends of the rock shafts are respectively provided with crank arms connected through appropriate links to an oscillating collar 259 journaled on the mandrel assembly shaft 152 (FIG. 4a). The oscillating collar has fixed thereto a driiving arm 260 which carries a follower roller 261, the latter engaging the track of a barrel cam 262 rigidly secured to the main drive shaft 166. Arcuate guide shoes 241, 264 and 265 assure proper entry and exit of the carton 51 into and out of registry with each of the bottom closing units 149, 150 (FIG. 8).

Upon completion of the bottom sealing operation as described, the blank is transferred through a sanitizer unit 279 by the transfer mechanism 266. The sanitizer mechanism may be of any suitable type, and may be employed in those instances where local health regulations require additional precautions even though the machine maintains the sanitary integrity of the blank under normal operating conditions. From the sanitizer unit, the partially formed blank is transferred to a rotary top breaker unit 108.

*Rotary top breaker unit*

Turning now to FIGS. 1, 4b, 17 and 18, it will be noted that the rotary top breaker unit 108 comprises a rotating turret 294 mounted on top of the machine console 95. In this instance, the turret 294 has four carton receptacles, each defined by pairs of laterally spaced bars 295 and a bottom support shelf 296. Arcuate guide rails 298 fixed on upright posts 299 prevent the cartons from falling out of the receptacles as the turret rotates. The unit 108 is adapted to receive cartons successively transferred from uprighting arm 286 along guide rails 300 and to prebend the top closure panels of the partially completed carton 51 along their various score lines. This is accomplished in each carton as the latter moves from the transfer point adjacent the guide rails 300 to another transfer point a little over 180° away where the carton is presented to the rotary filler unit 109.

For the purpose of effecting such prebending as an incident to rotation of the turret 294, the latter is provided with a breaker head 301 situated in overlying relation with each carton receptacle. Each breaker head 301 in this case happens to be of inverted T-shape and is mounted on an upstanding plunger 302. The latter extends downwardly into the housing of the turret 294 and carries a follower roller 304 which engages the track of a relatively large fixed cam 305 within the turret housing. Mounted in depending relation from each is head 301 and overlying the associated carton receptacle is a bending anvil 306 having a pair of opposed bending knees 308. The anvil 306 is supported as by means of bracket 309 fixed to the head and a depending stem 310 fixed to the bracket. Upon rotation of the turret, it will be perceived that the head 301 will descend under the action of the cam 305 until the head accosts the housing of the turret 294, at which point the bending knees 308 will be opposite the horizontal score line in the blank 51 which separates the side panels and the top closure panels.

Figure 17:
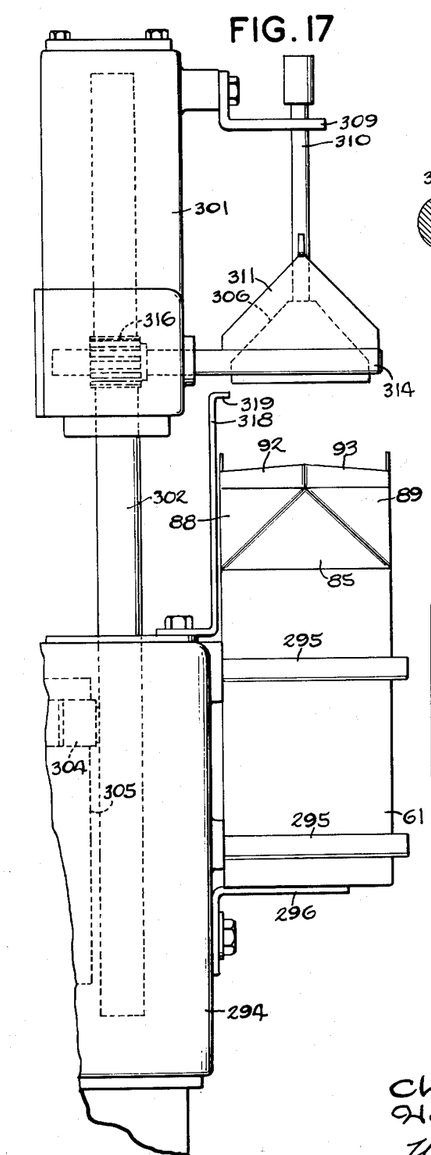
FIG. 17 is an enlarged fragmentary side elevation showing a portion of the rotary top breaker mechanism with a carton in place thereon.
Figure 18:
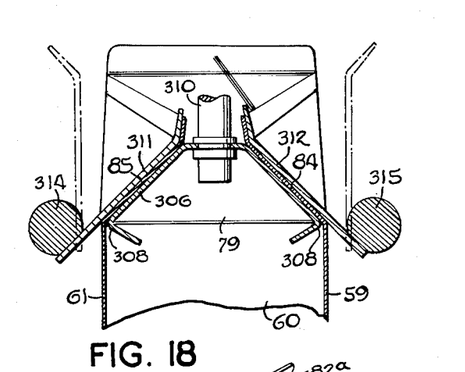
FIG. 18 is an enlarged fragmentary vertical sectional view through the upper portion of the carton and certain rotary breaker elements.

For infolding the triangular end panels 84 and 85 of the top closure, the head 301 is provided with a pair of triangular folder fingers 311 and 312 (FIGS. 1, 17 and 18). The latter are secured in any suitable manner to a pair of laterally spaced rock shafts 314, 315 projecting outwardly from the head 301 and adapted to fold the fingers 311 and 312 inwardly toward the anvil 306 upon descent of the head 301. Such action may be accomplished by means of rack and pinion connections 316 between the rock shafts 314, 315, and plunger 302 actuated by overrun of the plunger 302 further into the turret housing 294 after the head 301 has descended.

Figure 19:
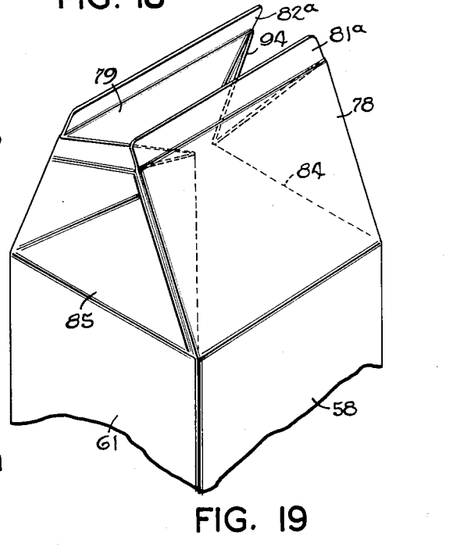
FIG. 19 is an enlarged fragmentary perspective view showing the upper portion of the carton after it emerges from the top breaker mechanism.

As a result of the foregoing action, the top closure panels of the carton 51 are prefolded inwardly to a position approximating that shown in FIG. 19. In order to permit withdrawal of the anvil 306 from the carton upon elevation of the head 301, the unit 108 is provided with a stripper plate 318 for each receptacle. Each plate has a horizontal ledge 319 overlying the top edge of the carton and in position to strip it from the anvil 306 as the latter is elevated.

Figure 4B:
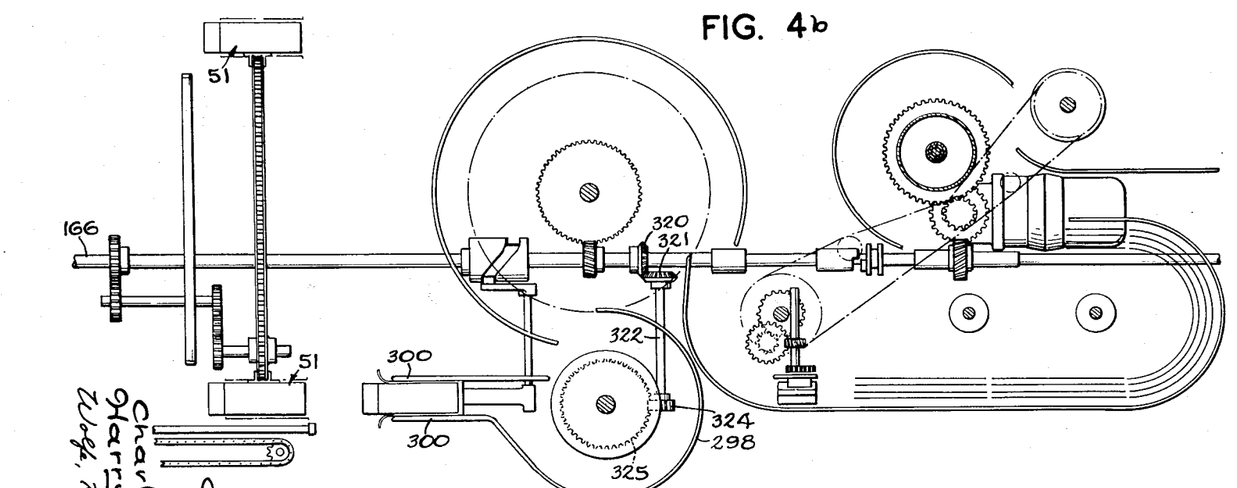

The turret 294 may be driven in timed relation with main drive shaft 166 by any appropriate power take-off. In the present case, this comprises bevel gears 320, 321, cam shaft 322 and spiral gears 324, 325 (FIG. 4b).

Having thus formed the bottom of the carton and passed the same through the rotary top breaker unit, the carton is in condition to be filled, closed and its top closure sealed.

We claim:

1. In a carton forming machine for receiving blanks of paperboard or the like coated with thermoplastic material and having foldable end closure panels defined therein, a forming mechanism comprising, in combination; a mandrel disposed for movement about an axis of rotation and adapted to receive an open-ended blank thereon; means defining a plurality of stations about said axis for successively folding, heating, closing, and sealing said end closure panels; means for moving said mandrel about said axis with an indexing motion for sequential registration with each said station; said folding station including a bridge member adapted for registration with said mandrel, a crosshead slidably mounted on said bridge member for reciprocating movement relative to the end face of said mandrel, a pair of folder wings fixed to the underside of said crosshead, a pair of folder fingers pivotally mounted on said frame, and means interposed between said crosshead and said fingers for rocking them inwardly as said crosshead approaches said mandrel.

2. In a carton forming machine for receiving blanks of paperboard or the like coated with thermoplastic material and having foldable end closure panels defined therein, a forming mechanism comprising, in combination; a mandrel disposed for movement about an axis of rotation and adapted to receive an open-ended blank thereon; means defining a plurality of stations about said axis for successively folding, heating, closing, and sealing said end closure panels; means for moving said mandrel about said axis with an indexing motion for sequential registration with each said station; said heating station including a heater dsposed for registration with the end of said mandrel and adapted for registry therewith, a tunnel in said heater facing said mandrel, and means defining outlet passages in the walls of said tunnel for discharging warm air against the blank closure panels on the mandrel.

3. In a carton forming machine for receiving blanks of paperboard or the like coated with thermoplastic material and having foldable end closure panels defined therein, a forming mechanism comprising, in combination; a mandrel disposed for movement about an axis of rotation and adapted to receive an open-ended blank thereon; means defining a plurality of stations about said axis for successively folding, heating, closing, and sealing said end closure panels; means for moving said mandrel about said axis with a step-by-step indexing motion for sequential registration with each said station; said closing station including a closer shoe adapted for registration with said mandrel, means defining a transverse tuck-in blade in said closer shoe, means for reciprocating said closer shoe between an initial position clear of the bottom closure panels and an active position engaging said bottom closure panels and tucking one within the other, and means for causing said closer shoe to dwell in said active position as said mandrel and blank pass out of registry therewith.

4. In a carton forming machine for receiving blanks of paperboard or the like coated with thermoplastic material and having foldable end closure panels defined therein, a forming mechanism comprising, in combination; a mandrel disposed for movement about an axis of rotation and adapted to receive an open-ended blank thereon; means defining a plurality of stations about said axis for successively folding, heating, closing, and sealing said end closure panels; means for moving said mandrel about said axis with a step-by-step indexing motion for sequential registration with each said station; said closing and sealing stations including means for closing said end closure panels, means including at least one pressure pad for sealing said end panels after closure, and means on said mandrel and on said pressure pad for cooling both the end face of said mandrel and said pressure pad.

5. In a machine for forming cartons from blanks of paperboard or the like having bottom closure panels defined therein, a bottom closure panel breaker comprising, in combination, a mandrel, a bridge member fixed to a support for registration with said mandrel, a crosshead slidably mounted on said bridge member for reciprocating movement relative to the end face of said mandrel, a pair of folder wings fixed to the underside of said crosshead, a pair of folder fingers pivotally mounted on said frame, and means interposed between said crosshead and said fingers for rocking them inwardly as said crosshead approaches said mandrel.

6. In a machine for forming cartons from blanks of paperboard or the like having bottom closure panels defined therein, a bottom closure panel breaker comprising, in combination, a mandrel, a bridge member fixed to a support for registration with said mandrel, a crosshead slidably mounted on said bridge member for reciprocating movement relative to the end face of said mandrel, a pair of folder wings fixed to the underside of said crosshead, a pair of folder fingers pivotally mounted on said frame, and means including a cam and follower interposed between said crosshead and said fingers for rocking them inwardly as said crosshead approaches said mandrel.

7. In a machine for forming cartons from blanks of paperboard or the like having bottom closure panels defined therein, a bottom closure panel breaker comprising, in combination, a mandrel, a bridge member fixed to a support for registration with said mandrel, a crosshead slidably mounted on said bridge member for reciprocating movement relative to the end face of said mandrel, a pair of folder wings fixed to the side of said crosshead facing said mandrel, a pair of folder fingers mounted on rock shafts journaled on said frame, a pair of rocker arms on respective ones of said rock shafts, a follower on each said rock shaft, a pair of cam arms fixed to said crosshead and slidably connected to said followers, said cam arms being adapted to shift said rocker arms and rock shafts whereby said fingers are rocked inwardly as said crosshead approaches said mandrel.

8. In a carton forming machine for thermoplastic coated blanks of paperboard or the like having end closure panels defined therein, means for heating said closure panels to adhesively activate the thermoplastic coating thereon and comprising, in combination, a mandrel movable about an axis and disposed generally radially thereof, a heater disposed for registration with the end of said mandrel and adapted for registry therewith, a tunnel in said heater facing said mandrel, and means defining outlet passages in the walls of said tunnel for discharging warm air against the blank closure panels on the mandrel.

9. In a carton forming machine for thermoplastic coated blanks of paperboard or the like having end closure panels defined therein, means for heating said closure panels to adhesively activate the thermoplastic coating thereon and comprising, in combination, a mandrel movable about a fixed axis and adapted to carry a blank, and a plurality of heaters disposed for registration sequentially with the end of said mandrel, each said heater having a tunnel facing said mandrel, each said heater also having outlet passages in the walls of its tunnel for discharging warm air against the blank closure panels on the mandrel.

10. In a carton forming machine for thermoplastic coated blanks of paperboard or the like having end closure panels defined therein, means for adhesively activating the thermoplastic coating on said closure panels for heat sealing and comprising, in combination, a mandrel movable about a fixed axis and adapted to receive a carton blank, a heater head disposed for registration with the end of said mandrel, a tunnel in said heater head facing said mandrel, means defining outlet passages in the walls of said tunnel for discharging warm air against the blank closure panels on the mandrel, a combustion chamber, means for supplying an air-gas mixture for burning in said combustion chamber, means for supplying secondary air to said combustion chamber, a conduit connecting said combustion chamber to said heater head, and control means responsive to stoppage of said machine for curtailing the flow of both the air-gas mixture and the secondary air to prevent thermal damage to the blank 11. In a carton forming machine for thermoplastic coated blanks of paperboard or the like having end closure panels defined therein, means for adhesively activating the thermoplastic coating on said closure panels for heat sealing and comprising, in combination, a mandrel movable about a fixed axis and adapted to receive a carton blank, a heater head disposed for registration with the end of said mandrel, a tunnel in said heater head facing said mandrel, means defining outlet passages in the walls of said tunnel for discharging warm air against the blank closure panels on the mandrel, means including a combustion chamber for supplying warm air to said heater head, and adjustable baffles in said head adapted to proportion the flow of warm air from each wall of said tunnel relative to the others.

12. In a carton forming machine for thermoplastic coated blanks of paperboard or the like having major and minor bottom closure panels defined therein, the major panels extending beyond the bottom edge of the carton blank, a mandrel movable about a fixed axis, a closer shoe adapted for registration with said mandrel, means defining a transverse tuck-in blade in said closer shoe, means for reciprocating said closer shoe between an initial position clear of the bottom closure panels and an active position engaging said bottom closure panels and tucking one within the other, and means for causing said closer shoe to dwell in said active position as said mandrel and blank pass out of registry therewith.

13. In a carton forming machine for thermoplastic coated blanks of paperboard or the like having major and minor bottom closure panels defined therein, the major panels extending beyond the bottom edge of the carton blank, a mandrel movable about a fixed axis, a closer shoe adapted for registration with said mandrel, means defining a tuck-in blade in said closer shoe, means for reciprocating said closer shoe between an initial position clear of the bottom closure panels and an active position with said tuck-in blade engaging said bottom closure panels and tucking one within the other, means for causing said closer shoe to dwell in said active position as said mandrel and blank pass out of registry therewith, a first fixed guide shoe mounted in close alignment with said initial position of said closer shoe on the side approached by said mandrel, and a second fixed guide shoe mounted in alignment with said active position of said closer shoe on the side from which said mandrel recedes.

14. In a carton forming machine for thermoplastic coated blanks of paperboard or the like having heat sealable end closure panels, the combination of a mandrel movable about an axis and adapted to carry a carton blank, means for heating said end closure panels of said blank to adhesively activate the thermoplastic coating thereon, means for closing said end closure panels, means including at least one pressure pad for sealing said end panels after closure, means for cooling the end face of said mandrel, and means for cooling the end face of said pressure pad.

15. In a carton forming machine for handling blanks of paperboard or the like having top closure panels defined therein, a top breaker unit comprising, in combination, a rotatable turret, a breaker head mounted on said turret and reciprocable vertically thereon, a bending anvil mounted on said head in depending relation therefrom, a pair of opposed breaker fingers rockably mounted on said head for coaction with said bending anvil, a fixed cam within said turret, a plunger connected with said fixed cam and said breaker head for reciprocating the latter vertically, and means for rocking said breaker fingers as an incident to such reciprocation.

16. In a machine for forming cartons from blanks of paperboard or the like having top closure panels defined therein, a top breaker unit comprising the combination of a rotatable turret, a breaker head mounted on said turret for reciprocation relative thereto, a bending anvil carried on said head and spaced therefrom, a pair of opposed breaker fingers also carried on said head for coaction with said bending anvil in prebending the top closure panels of said blank, rockable mounting members on said head and fixed to said breaker fingers, a plunger slidably housed within said breaker head and adapted to support the same at one end of its stroke, rack and pinion connections between said plunger and said rockable mounting members, a stop on said turret for arresting the motion of said breaker head prior to completion of movement of said plunger, a fixed cam on said turret, follower means connecting said fixed cam on said turret, follower means connecting said fixed cam to said plunger, said fixed cam having a throw providing overrun for said plunger after said head has engaged said stop whereby the overrun of said plunger actuates said rack and pinion connections for rocking said breaker fingers as an incident to such plunger overrun.

17. In a carton forming machine for handling blanks of paperboard or the like having top closure panels defined therein, a top breaker unit comprising the combination of a rotatable turret, a breaker head mounted on said turret for reciprocation relative thereto between a raised and a lowered position, a bending anvil mounted on said head in projecting relation therefrom, a pair of opposed breaker fingers rockably mounted on said head for coaction with said bending anvil, a fixed cam within said turret, a plunger connected with said fixed cam and said breaker head for reciprocating the latter vertically, means for rocking said breaker fingers as an incident to such reciprocation, and a stripper member fixed to said turret having an abutment positioned to accost the top edge of a carton and strip the latter from said bending anvil as said head returns to raised position.

References Cited by the Examiner

UNITED STATES PATENTS 2,737,090  3/56  Nordquist _________ 93—44.1 X

FRANK E. BAILEY, *Primary Examiner.*